(12) United States Patent
Yada et al.

(10) Patent No.: US 12,083,935 B2
(45) Date of Patent: Sep. 10, 2024

(54) VEHICLE INCLUDING A DRIVE UNIT AND A SEAT PROVIDED ON THE DRIVE UNIT VIA A LIFT UNIT

(71) Applicant: HONDA MOTOR CO., LTD., Tokyo (JP)

(72) Inventors: Wataru Yada, Saitama (JP); Daisuke Nohara, Saitama (JP); Sachiko Yamamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 18/059,736

(22) Filed: Nov. 29, 2022

(65) Prior Publication Data
US 2023/0249591 A1  Aug. 10, 2023

(30) Foreign Application Priority Data
Feb. 8, 2022  (JP) ................. 2022-017875

(51) Int. Cl.
| | |
|---|---|
| B60N 2/18 | (2006.01) |
| B60N 2/24 | (2006.01) |
| B60N 3/06 | (2006.01) |

(52) U.S. Cl.
CPC ........... B60N 2/1807 (2013.01); B60N 3/063 (2013.01); B60N 2002/247 (2013.01)

(58) Field of Classification Search
CPC ...... A61G 5/128; A61G 5/1059; B60N 3/063; B60N 2/1807; B60N 2002/247
USPC .................................................. 297/DIG. 10
See application file for complete search history.

(56) References Cited

U.S. PATENT DOCUMENTS

| | | | | |
|---|---|---|---|---|
| 3,807,795 A | * | 4/1974 | Weant ................ | A61G 5/1054 |
| | | | | 297/DIG. 10 |
| 5,286,089 A | * | 2/1994 | Goldman ............ | A47C 7/024 |
| | | | | 5/653 |
| 10,525,784 B2 | * | 1/2020 | Goffer ................ | A61G 5/1048 |
| 2021/0282990 A1 | | 9/2021 | Kato et al. | |

FOREIGN PATENT DOCUMENTS

| | | | | |
|---|---|---|---|---|
| JP | 2005132134 A | * | 5/2005 | ........... B60N 2/1695 |
| JP | 2021146748 A | | 9/2021 | |
| WO | WO-2019244444 A | * | 12/2019 | ............. A61G 5/041 |

* cited by examiner

Primary Examiner — Milton Nelson, Jr.
(74) Attorney, Agent, or Firm — Armstrong Teasdale LLP (57) ABSTRACT

A vehicle includes: a vehicle body frame; a drive unit provided on the vehicle body frame and movable on a floor surface; a seat disposed above the vehicle body frame to support buttocks of a user; a lift unit provided between the vehicle body frame and the seat to raise and lower the seat between a low position and a high position; and at least one support member extending downward from the seat and provided, at a lower portion thereof, with a footrest for supporting soles of the user. The support member is provided to be displaceable vertically relative to the seat, and the support member is displaced such that a distance between the seat and the footrest when the seat is in the high position is greater than a distance between the seat and the footrest when the seat is in the low position.

8 Claims, 9 Drawing Sheets

VEHICLE INCLUDING A DRIVE UNIT AND A SEAT PROVIDED ON THE DRIVE UNIT VIA A LIFT UNIT

TECHNICAL FIELD

The present invention relates to a vehicle including a drive unit and a seat provided on the drive unit via a lift unit.

BACKGROUND ART

JP2021-146748A discloses a vehicle including a drive unit and a seat provided on the drive unit via a lift unit. The drive unit includes a drive wheel which is driven under an inverted pendulum control. The vehicle disclosed in JP2021-146748A is configured to lower the position of the seat when the user gets on and off the vehicle than when the vehicle is traveling so that the user can easily get on and off the vehicle.

If the height of the eyes of the user seated on the vehicle is high, the user is less likely to have a feeling of oppression from a standing person and it is easier for the user to have communication with the standing person. However, if the height of the user's eyes becomes high when the user is in the seating posture in which the thighs extend horizontally, the user may feel a sense of unease.

SUMMARY OF THE INVENTION

In view of the foregoing background, a primary object of the present invention is to provide a vehicle which can raise the height of the user's eyes while giving a sense of ease to the user.

To achieve the above object, one aspect of the present invention provides a vehicle (1), comprising: a vehicle body frame (2); a drive unit (3) provided on the vehicle body frame and movable on a floor surface; a seat (4) disposed above the vehicle body frame to support buttocks of a user; a lift unit (5) provided between the vehicle body frame and the seat to raise and lower the seat between a low position and a high position; and at least one support member (51) extending downward from the seat and provided, at a lower portion thereof, with a footrest (51A) for supporting soles of the user, wherein the support member is provided to be displaceable vertically relative to the seat, and the support member is displaced such that a distance between the seat and the footrest when the seat is in the high position is greater than a distance between the seat and the footrest when the seat is in the low position.

According to this aspect, it is possible to provide a vehicle which can raise the height of the user's eyes while giving a sense of ease to the user. When the seat moves from the low position to the high position, the position of the eyes of the user seated on the seat becomes higher. Here, since the distance between the footrest and the seat is increased when the seat moves from the low position to the high position, the legs of the user seated on the seat are extended vertically. Consequently, the user's back is straightened and the posture of the user becomes easier to stabilize. Therefore, even when the seat is raised to the high position, the user can have a sense of ease.

Preferably, the seat includes a tubular receiving part receiving part (53) that extends vertically, the support member includes a shaft part (51B) which is slidably supported in the receiving part and to which the footrest is joined and a stopper (51C) provided on an upper portion of the shaft part to define a lower limit position of the shaft part relative to the receiving part by contacting an upper end of the receiving part, and when the seat is in the low position, a lower end of the shaft part contacts the floor surface and the stopper is disposed in a position separated upward from the receiving part.

According to this aspect, the support member provided with the footrest can be displaced relative to the seat due to gravity. Therefore, the energy efficiency of the vehicle can be improved.

Preferably, the lower end of the shaft part is provided with a first roller (51D).

According to this aspect, the vehicle can travel in the state in which the support member is grounded.

Preferably, the vehicle further comprises: at least one first leg (24) extending downward from the seat and provided with a second roller (23) at a lower end thereof; and at least one second leg (27) extending downward from the seat and provided with a contact member (26) at a lower end thereof, wherein when the seat is in the high position, the second roller and the contact member are separated from the floor surface, and when the seat is in the low position, the second roller and the contact member contact the floor surface.

According to this aspect, the posture of the vehicle can be stabilized and the vehicle is maintained in the stop state when the seat is in the low position.

Preferably, when the seat is in the high position, a lower end of the contact member is disposed lower than a lower end of the second roller and a lower end of the first roller is disposed higher than the lower end of the contact member.

According to this aspect, when the seat moves to the low position, the contact member can be brought into contact with the ground earlier than the support member is. Thereby, the support member can be grounded with good stability with the movement of the vehicle being restricted by the contact member.

Preferably, the seat includes a pad (19) configured to contact the buttocks and thighs of the user, and an upper surface of a front portion of the pad is provided with an inclined surface (19A) that is inclined downward in a forward direction.

According to this aspect, when the distance between the footrest and the seat becomes large, the user's legs can be easily extended vertically.

Preferably, an upper surface of a rear portion of the pad is provided with a recess (19B) that is recessed downward.

According to this aspect, when the seat is in the low position, the ischia of the user are accommodated in the recess. Therefore, the seating posture of the user can be stabilized.

Preferably, the seat includes a knee belt (55) for restraining a knee of the user to the front portion of the pad.

According to this aspect, the knee belt and the front portion of the pad restrain the knees of the user, whereby the posture of the user can be stabilized in the state in which the user's legs are extended.

Preferably, an angle and a front-rear position of the footrest relative to the seat when the seat is in the low position are same as an angle and a front-rear position of the footrest relative to the seat when the seat is in the high position.

According to this aspect, the angle and the front-rear position of the footrest relative to the seat does not change when the seat moves from the low position to the high position, and therefore, the posture of the user is stabilized.

According to the foregoing configuration, it is possible to provide a vehicle which can raise the height of the user's eyes while giving a sense of ease to the user.

DETAILED DESCRIPTION OF THE INVENTION

In the following, a preferred embodiment of a vehicle according to the present invention will be described with reference to the appended drawings. In the present embodiment, the vehicle is configured as an inverted pendulum vehicle.

Figure 1:
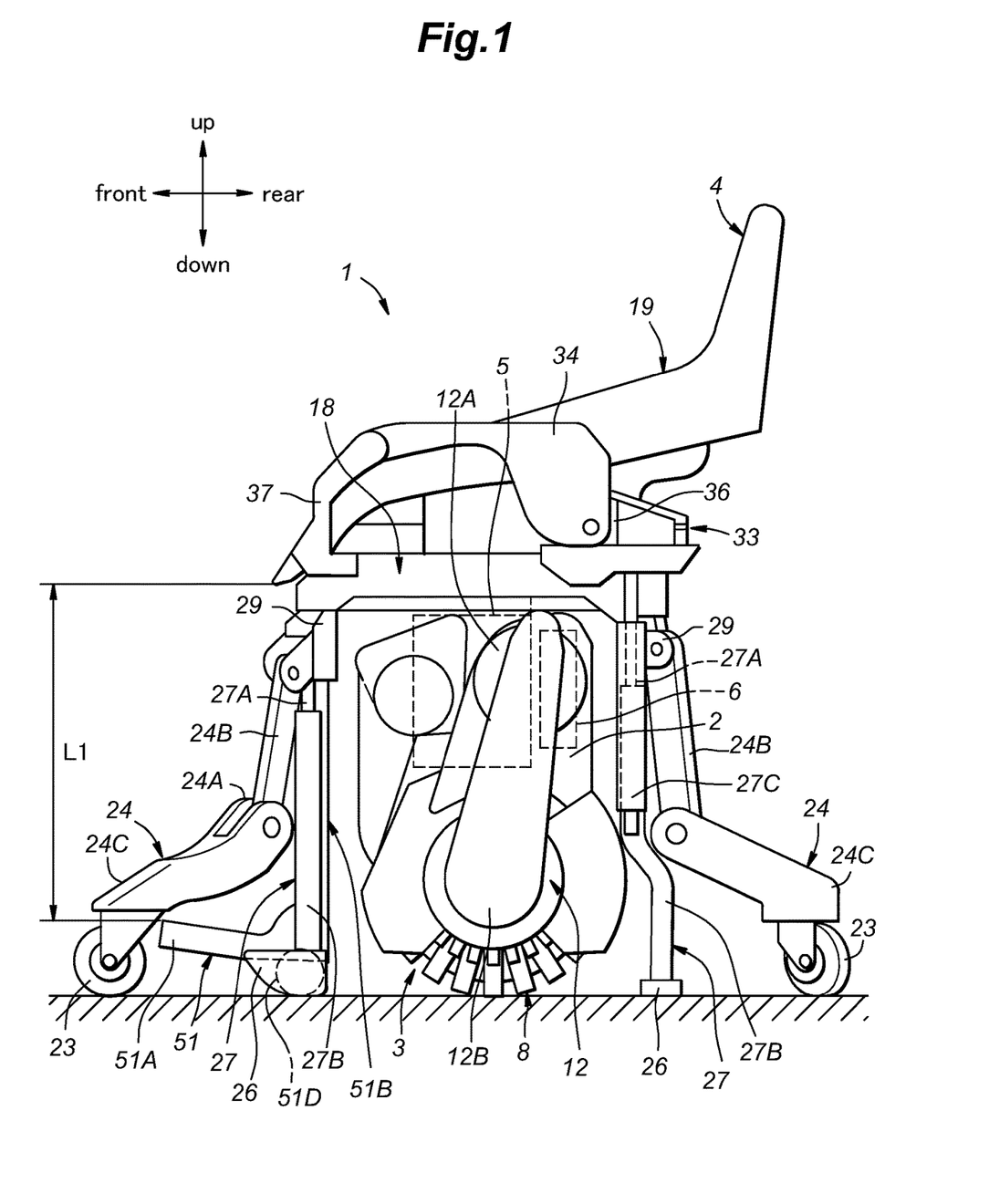
FIG. 1 is a side view of a vehicle according to an embodiment of the present invention as seen from left when the seat is in a low position.
Figure 2:
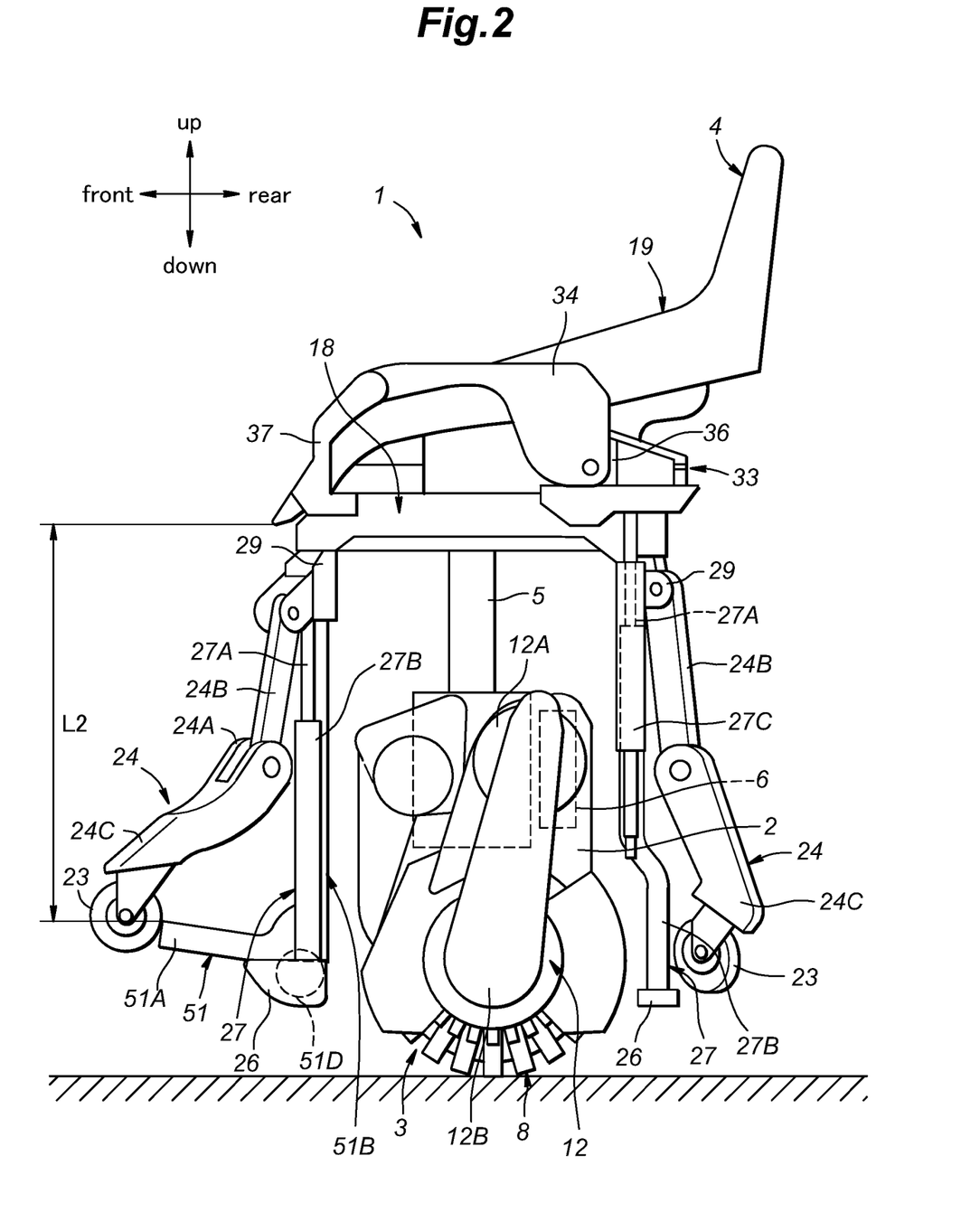
FIG. 2 is a side view of the vehicle as seen from left when the seat is in a high position.

As shown in FIGS. 1 and 2, the vehicle 1 includes a vehicle body frame 2, at least one drive unit 3 provided on the vehicle body frame 2 and movable on a floor surface, a seat 4 provided above the vehicle body frame 2 to support buttocks of a user, a lift unit 5 provided between the vehicle body frame 2 and the seat 4, and a control unit 6 that controls the drive unit 3 and the lift unit 5.

Figure 4:
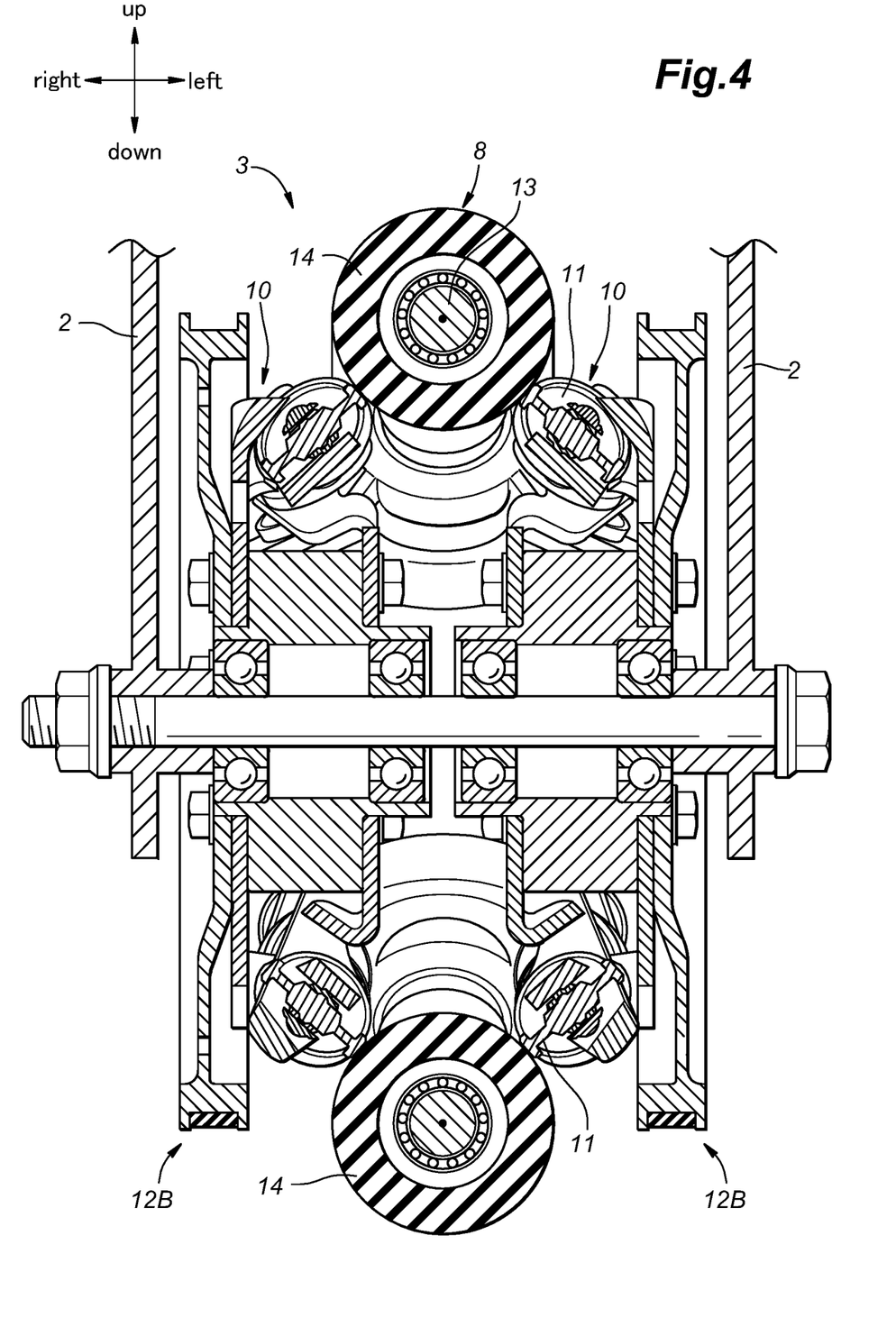
FIG. 4 is a sectional view of a drive unit.

In this embodiment, left and right drive units 3 are provided on left and right side portions of the vehicle body frame 2, respectively. Each drive unit 3 includes a drive wheel 8 that is driven under an inverted pendulum control. In the present embodiment, each drive unit 3 is a friction drive unit. As shown in FIG. 4, the friction drive unit includes a pair of drive disks 10 rotatably supported on the vehicle body frame 2, multiple drive rollers 11 rotatably supported on each of the drive disks 10, an annular drive wheel 8 disposed between the left and right drive disks 10 to be in contact with the drive rollers 11, and a pair of actuators 12 for individually rotating the respective drive disks 10. The drive disks 10 are disposed mutually coaxially, and the rotation axes thereof extend in the lateral direction. As shown in FIG. 1, each actuator 12 includes an electric motor 12A and a transmission mechanism 12B that transmit the rotational force of the electric motor 12A to the corresponding drive disk 10. The transmission mechanism 12B may be a belt transmission mechanism, for example. Preferably, the electric motor 12A is disposed above the drive disk 10.

As shown in FIGS. 1 and 4, the drive wheel 8 is annular in shape and is disposed between the two drive disks 10 to be coaxial with the drive disks 10. Also, the drive wheel 8 is in contact with the multiple drive rollers 11 and is rotatable about a central axis. The drive wheel 8 includes a ring core 13 and multiple driven rollers 14 rotatably supported by the ring core 13. Each driven roller 14 is supported by the ring core 13 to be rotatable about an annular center line of the ring core 13. Each driven roller 14 receives a load from the drive disks 10 and rotates relative to the ring core 13.

When the two drive disks 10 are turned in the same direction at the same rotation speed, the drive wheel 8 rotates in the same direction and at the rotation speed as the drive disks 10. When there is a difference in the rotation direction or the rotation speed between the two drive disks 10, the driven rollers 14 of the drive wheel 8 rotate relative to the ring core 13. As a result, the drive unit 3 can produce a lateral propulsion force relative to the floor surface.

A battery is supported on a rear portion of the vehicle body frame 2. Also, a control unit 6 is mounted inside or on a rear portion of the vehicle body frame 2.

The lift unit 5 is a device for raising and lowering the seat 4 between a low position and a high position. The seat 4 includes a seat frame 18 supported by the lift unit 5 and a pad 19 supported on top of the seat frame 18. The user can be seated on the pad 19. The lift unit 5 is joined to the vehicle body frame 2 and the seat frame 18. The lift unit 5 vertically displaces the seat frame 18 relative to the vehicle body frame 2 by extending and contracting in the up-down direction. For example, the lift unit 5 may be a ball screw mechanism or a rack-and-pinion mechanism driven by an electric motor, or may be a linear motor. Also, the lift unit 5 may be an air cylinder that expands and contracts due to compressed air from a compressor.

The lift unit 5 preferably includes a base supported on the vehicle body frame 2, a movable body provided on the base to be vertically movable and joined to the seat frame 18, a ball screw mechanism for moving the movable body relative to the base, and an electric motor that drives the ball screw mechanism, for example.

As shown in FIG. 2, the high position of the seat 4 preferably is right above the low position of the seat 4. In another embodiment, the high position of the seat 4 may be offset laterally relative to the low position of the seat 4.

Figure 3:
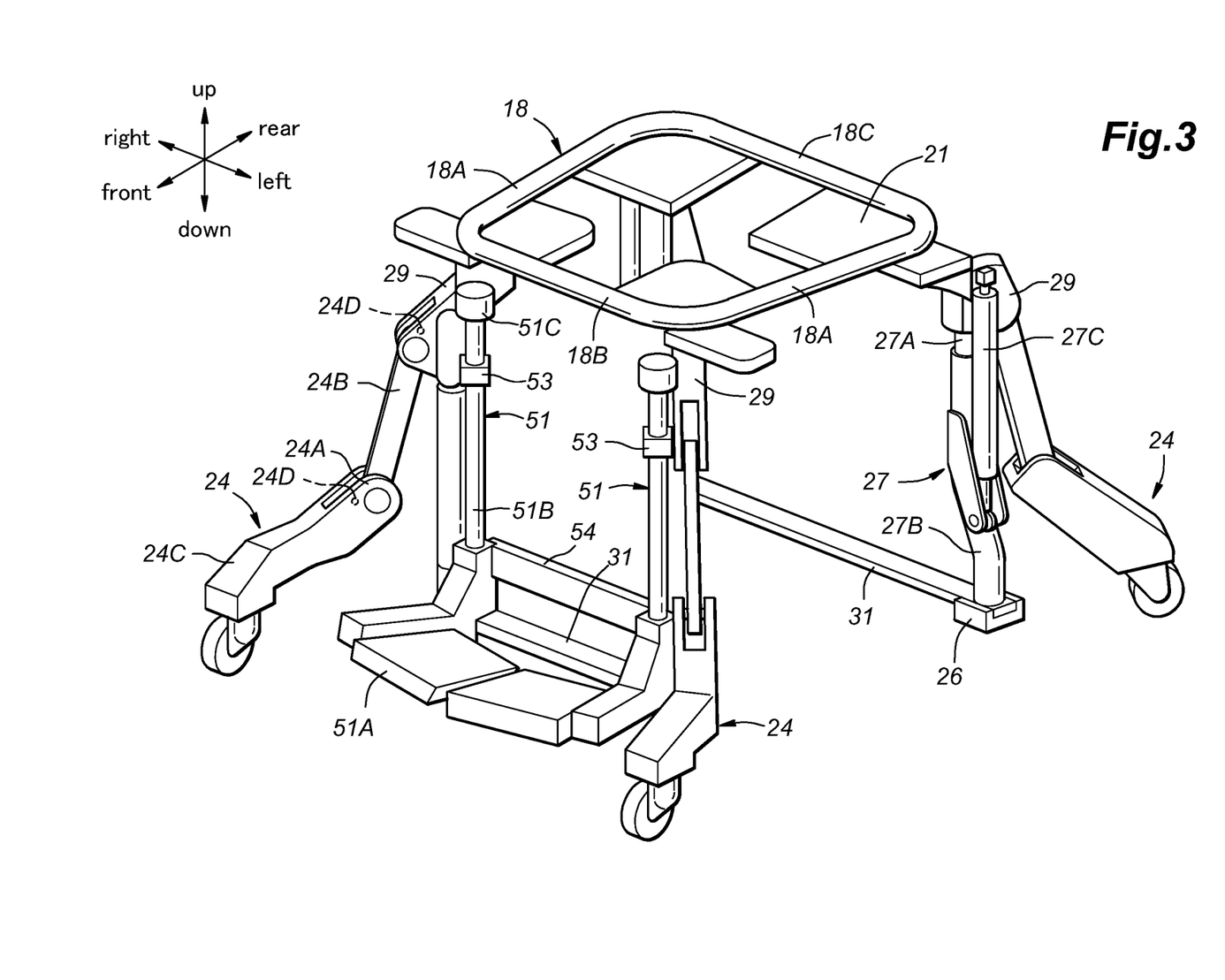
FIG. 3 is a perspective view of a seat frame assembly.

As shown in FIG. 3, the seat frame 18 includes a pair of left and right side members 18A extending in the fore and aft direction, a front member 18B extending laterally and joined to the front ends of the left and right side members 18A, and a rear member 18C extending laterally and joined to the rear ends of the left and right side members 18A. The seat frame 18 is formed in a quadrilateral frame shape as seen in plan view. The seat frame 18 further includes multiple inner plates 21 extending laterally inward from the left and right side members 18A and joined to the front member 18B or the rear member 18C. The multiple inner plates 21 have vertically facing surfaces. Each inner plate 21 is joined to the upper end of the lift unit 5. The inner plates 21, the left and right side members 18A, the front member 18B, and the rear member 18C support the pad 19 from below.

The vehicle 1 includes at least one first leg 24 extending downward from the seat 4 and provided with a roller 23 at a lower end thereof and at least one second leg 27 extending downward from the seat 4 and provided with a contact member 26 at a lower end thereof. In the present embodiment, the vehicle 1 has four first legs 24 and four second legs 27.

At each of the four corners of the seat frame 18, a leg supporting part 29 that protrudes downward is provided. A front left leg supporting parts 29 is provided at the coupling part between the front end of the left side member 18A and the left end of the front member 18B. A front right leg supporting part 29 is provided at the coupling part between the front end of the right side member 18A and the left end of the front member 18B. A rear left leg supporting part 29 is provided at the coupling part between the rear end of the left side member 18A and the left end of the rear member 18C. A rear right leg supporting part 29 is provided at the coupling part between the rear end of the right side member 18A and the right end of the rear member 18C.

Each of the first legs 24 is joined to the seat frame 18 via a corresponding one of the leg supporting parts 29 and each of the second legs 27 is joined to the seat frame 18 via a corresponding one of the leg supporting parts 29. Namely, each leg supporting part 29 has one first leg 24 and one second leg 27 connected thereto. The first legs 24 have the same configuration as each other, and the second legs 27 have the same configuration as each other.

Each first leg 24 is pivotably joined to the corresponding leg supporting part 29. Each first leg 24 is pivotable between a stowed position set near the vehicle body frame 2 and a deployed position more separated laterally from the vehicle body frame 2 than the stowed position is.

The first leg 24 may include a first leg upper portion 24B and a first leg lower portion 24C joined to each other via a joint 24A. The upper end of the first leg upper portion 24B is pivotably joined to the corresponding leg supporting part 29. The upper end of the first leg lower portion 24C is pivotably joined to the lower end of the first leg upper portion 24B. The connection part between the lower end of the first leg upper portion 24B and the upper end of the first leg lower portion 24C constitutes the joint 24A. Preferably, the pivot axis of the first leg upper portion 24B relative to the leg supporting part 29 and the pivot axis of the first leg lower portion 24C relative to the first leg upper portion 24B are arranged parallel to each other. In another embodiment, the joint 24A may be omitted and the first leg upper portion 24B and the first leg lower portion 24C may be formed integrally. Also, the leg supporting part 29 and the first leg upper portion 24B may be formed integrally and the first leg lower portion 24C may be connected to the first leg upper portion 24B via the joint 24A.

The lower end of the first leg lower portion 24C has a roller 23 rotatably joined thereto. Preferably, the roller 23 is a caster having a rotation shaft that rotates relative to the first leg lower portion 24C about a vertical axis. In another embodiment, instead of the roller 23, a ball may be supported on the lower end of the first leg lower portion 24C.

The lower end of the front left first leg 24 moves forward and leftward from the stowed position toward the deployed position. The lower end of the front right first leg 24 moves forward and rightward from the stowed position toward the deployed position. The lower end of the rear left first leg 24 moves rearward and leftward from the stowed position toward the deployed position. The lower end of the rear right first leg 24 moves rearward and rightward from the stowed position toward the deployed position. The moving direction of each first leg 24 from the stowed position to the deployed position may be changed as appropriate.

The first leg 24 includes multiple stoppers 24D that restrict the pivoting range. Preferably, the multiple stoppers 24D are provided inside the first leg 24. The stoppers 24D are preferably provided at the connection part between the leg supporting part 29 and the upper end of the first leg upper portion 24B and at the connection part between the lower end of the first leg upper portion 24B and the upper end of the first leg lower portion 24C.

The first leg 24 includes urging members (not shown in the drawings) for urging the first leg 24 from the deployed position toward the stowed position. Specifically, the urging members are preferably provided at the connection part between the leg supporting part 29 and the upper end of the first leg upper portion 24B and at the connection part between the lower end of the first leg upper portion 24B and the upper end of the first leg lower portion 24C. Each urging member may be a torsion spring, a tension coil spring, a compression coil spring, or the like. Each first leg 24 is displaced from the stowed position to the deployed position when the roller 23 is pushed by the floor surface. Also, dampers (not shown in the drawings) may be provided at the connection part between the leg supporting part 29 and the upper end of the first leg upper portion 24B and at the connection part between the lower end of the first leg upper portion 24B and the upper end of the first leg lower portion 24C. Each damper preferably is a rotation damper, a piston damper or the like.

The second leg 27 is capable of extending and contracting in the up-down direction and is urged in the extending direction. The second leg 27 includes a second leg upper portion 27A extending downward from the corresponding leg supporting part 29 and a second leg lower portion 27B supported on the second leg upper portion 27A to be movable in the up-down direction. Preferably, the second leg upper portion 27A is formed of a linearly extending pipe and the second leg lower portion 27B is formed of a pipe slidably receiving the second leg upper portion 27A, for example.

The lower end of the second leg lower portion 27B is provided with a contact member 26. The contact member 26 preferably has flexibility higher than that of the second leg lower portion 27B. Also, the contact member 26 preferably has a friction coefficient higher than that of the second leg lower portion 27B. The contact member 26 is preferably made of rubber or elastomer, for example. With the contact member 26 of each second leg 27 contacting the ground, the vehicle 1 grounded via the rollers 23 can be maintained in the stop state. Due to the friction force between the contact member 26 provided at the lower end of each second leg 27 and the floor surface, the vehicle 1 is maintained in the stop state. Since the vehicle is maintained in the stop state due to the friction force between the contact member 26 and the floor surface, it is unnecessary to supply electric power to the drive units 3 and thus the energy efficiency can be improved. Also, as a result of making the vehicle 1 stopped, it becomes easy to determine the position of the center of gravity of the vehicle 1 when the seat 4 is moved to the high position and the inverted pendulum control is started.

Between the second leg upper portion 27A and the second leg lower portion 27B, an urging member is interposed to urge the second leg lower portion 27B downward relative to the second leg upper portion 27A. The urging member preferably is a compression coil spring. Preferably, the urging member is disposed inside the second leg lower portion 27B and is in contact with the lower end of the second leg upper portion 27A. The second leg 27 is urged in the extending direction by the urging member.

Each second leg 27 includes a damper 27C for attenuating the extending and contracting movement. The damper 27C may be a piston damper. The damper 27C extends vertically and includes an upper end joined to the second leg upper portion 27A and a lower end joined to the second leg lower portion 27B. Instead of being joined to the second leg upper portion 27A, the upper end of the damper 27C may be joined to the leg supporting part 29 to which the second leg upper portion 27A is joined.

Each second leg 27 is provided closer to the vehicle body frame 2 than the correspond first leg 24 is. The front left second leg 27 is disposed more rightward and rearward than the front left first leg 24, the front right second leg 27 is disposed more leftward and rearward than the front right first leg 24, the rear left second leg 27 is disposed more rightward and forward than the rear left first leg 24, and the rear right second leg 27 is disposed more leftward and forward than the rear right first leg 24.

The lower portions of adjacent ones of the second legs 27 are connected to each other by a coupling member 31. In the present embodiment, the front left second leg lower portion 27B and the front right second leg lower portion 27B are connected by a laterally extending coupling member 31, and the rear left second leg lower portion 27B and the rear right second leg lower portion 27B are connected by another laterally extending coupling member 31.

As shown in FIG. 2, when the seat 4 is in the high position, each roller 23 and each contact member 26 are separated from the floor surface. When the seat 4 is in the high position, the lower end of each contact member 26 is disposed lower than the lower end of each roller 23. As shown in FIG. 1, when the seat 4 is in the low position, each roller 23 and each contact member 26 contact the floor surface. When the seat 4 moves from the high position to the low position, each contact member 26 comes into contact with the floor surface earlier than each roller 23 does. Therefore, when the seat 4 moves to the low position, the vehicle can be brought into the stop state early.

Since each second leg 27 is configured to be capable of extending and contracting in the up-down direction, each contact member 26 can reliably contact the floor surface. Also, since each second leg 27 is provided with the damper 27C, an impact when the seat 4 reaches the low position can be reduced. Since adjacent ones of the second leg lower portion 27B are coupled by the coupling member 31, the stiffness of each second leg 27 increases. Therefore, each second leg 27 can restrict the movement of the vehicle 1 reliably.

Each first leg 24 is moved from the stowed position to the deployed position when pushed by the floor surface. Thereby, the distance between the ground-contact points of the first legs 24 is increased so that the posture of the vehicle 1 in the low position is stabilized.

Figure 5:
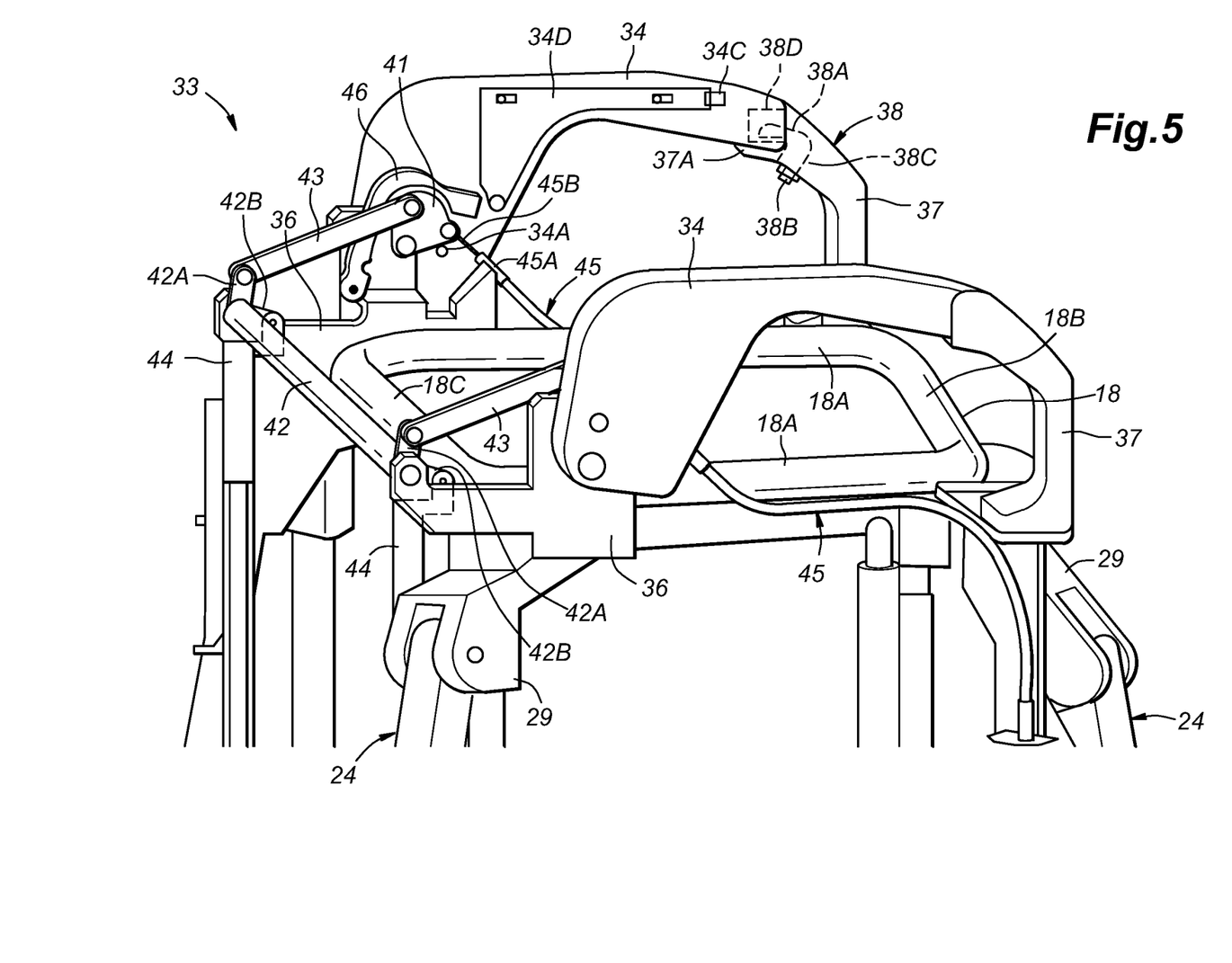
FIG. 5 is a perspective view showing a lever and a transmission mechanism.

As shown in FIG. 5, the second leg lower portion 27B of each second leg 27 is connected to at least one lever 34 via a transmission mechanism 33. In the present embodiment, a pair of left and right levers 34 is provided. The left and right levers 34 and their support structures are bilaterally symmetrical, and therefore, in the following, description will be made of the left lever 34 and its support structure.

A rear lever support 36 is provided on the rear portion of the side member 18A. The rear lever support 36 extends upward from the corresponding side member 18A. The base end portion of the lever 34 is pivotably joined to the rear lever support 36. The pivot axis of the lever 34 extends in the lateral direction. The lever 34 pivots between an initial position in which the lever 34 extends forward and horizontally from the base end portion and an operation position in which the lever 34 is located when caused to pivot upward and rearward from the initial position.

A front lever support 37 is provided on the front portion of the side member 18A. The front lever support 37 extends rearward from the corresponding side member 18A. The upper end of the front lever support 37 is formed with a lever receiving part 37A for receiving the tip end portion of the lever 34 in the initial position. The front lever support 37 supports the tip of the lever 34 in the initial position from below.

The front lever support 37 includes a lock device 38 for locking the laterally corresponding lever 34 in the initial position. The lock device 38 includes a displacement member 38C displaceably supported on the front lever support 37 and having a locking claw 38A and a tab 38B, and an urging member (not shown in the drawings) that urges the displacement member 38C. The displacement member 38C is preferably provided on the front lever support 37 to be pivotable or to be slidingly movable. The displacement member 38C is displaceable between a protruding position in which the locking claw 38A protrudes into the lever receiving part 37A and a release position in which the locking claw 38A retreats into the front lever support 37. The tab 38B protrudes out from the front lever support 37. Preferably, the tab 38B protrudes downward from the front lever support 37. The urging member urges the displacement member 38C toward the protruding position. The tip of the lever 34 is formed with a locking hole 38D for receiving the locking claw 38A. With the locking claw 38A protruding into the locking hole 38D, the lever 34 is maintained in the initial position. When the displacement member 38C moves to the release position, the lever 34 becomes able to pivot from the initial position to the operation position. By operating the tab 38B, the user can cause the displacement member 38C to move the release position.

Each of the multiple second legs 27 is connected to the transmission mechanism 33. The transmission mechanism 33 displaces each of the second legs 27 according to displacement of one of the two levers 34. The transmission mechanism 33 pulls up each of the second legs 27 according to displacement of one of the two levers 34. Also, the transmission mechanism 33 does not transmit the displacement of one of the two levers 34 to the other of the two levers 34.

The transmission mechanism 33 includes a pair of left and right input members 41, a drive shaft 42, a pair of left and right first links 43, a pair of left and right second links 44, a pair of left and right control cables 45, and a pair of left and right lock arms 46. In the transmission mechanism 33, the left and right elements have identical configuration, and therefore, description may be made of one of the left and right elements where appropriate.

The input member 41 is pivotably supported by the rear lever support 36. The pivot axis of the input member 41 is arranged to be coaxial with the pivot axis of the lever 34. The input member 41 pivots between an initial position and an operation position. The lever 34 is provided with a first pressing part 34A. The first pressing part 34A may be a pin joined to the lever 34. When the lever 34 pivots from the initial position to the operation position, the first pressing part 34A presses the input member 41, and the input member 41 pivots from the initial position to the operation position. On the other hand, when the lever 34 is in the initial position, the input member 41 can be separated from the first pressing part 34A to pivot to the operation position. Namely, the input member 41 separably contacts the lever 34.

The drive shaft 42 extends laterally. The left end of the drive shaft 42 is pivotably supported by the left rear lever support 36 and the right end of the drive shaft 42 is pivotably supported by the right rear lever support 36. The drive shaft 42 has a pair of left and right first arms 42A and a pair of left and right second arms 42B. The left first arm 42A and the left second arm 42B are provided at the left end of the drive shaft 42, and the right first arm 42A and the right second arm 42B are provided at the right end of the drive shaft 42. The first arms 42A and the second arms 42B protrude in the radial direction of the drive shaft 42. The left first arm 42A is connected to the left input member 41 by a first link 43, and the left second arm 42B is connected to the rear left second leg lower portion 27B by a second link 44. The right first arm 42A is connected to the right input member 41 by a first link 43, and the right second arm 42B is connected to the rear right second leg lower portion 27B by a second link 44.

The control cable 45 includes a tubular outer casing 45A and an inner cable 45B slidably supported inside the outer casing 45A. One end of the outer casing 45A of the left control cable 45 is joined to the left rear lever support 36, and the other end is joined to the front left second leg upper portion 27A or the front left leg supporting part 29. One end of the inner cable 45B of the left control cable 45 is connected to the left input member 41, and the other end is connected to the front left second leg lower portion 27B. Similarly, one end of the outer casing 45A of the right control cable 45 is joined to the right rear lever support 36, and the other end is joined to the front right second leg upper portion 27A or the front right leg supporting part 29. One end of the inner cable 45B of the right control cable 45 is connected to the right input member 41, and the other end is connected to the front right second leg lower portion 27B.

Each second leg 27 is urged in the extending direction by an urging member. The urging force on the second leg 27 on the rear side is transmitted to the input member 41 via the second link 44, the drive shaft 42, and the first link 43, so that the input member 41 is urged toward the initial position. Also, the urging force on the second leg 27 on the front side is transmitted to the input member 41 via the control cable 45, so that the input member 41 is urged toward the initial position.

The lock arm 46 is pivotably supported by the rear lever support 36. The lock arm 46 is disposed around the input member 41 and is urged toward the input member 41 by an urging member. When the input member 41 is in the operation position, the lock arm 46 locks the input member 41 and maintains the input member 41 in the operation position. Preferably, the lock arm 46 and the input member 41 include engagement parts that engage each other when the input member 41 is in the operation position. The tip end portion of the lever 34 is provided with a release button 34C. The release button 34C is connected to the lock arm 46 via a transmission member 34D. When the release button 34C is pushed in, the transmission member 34D is moved toward the lock arm 46 in accordance with the movement of the release button 34C, and the transmission member 34D pushes the lock arm 46 in a direction away from the input member 41. As a result, the locking of the input member 41 by the lock arm 46 is released, and the input member 41 can return to the initial position under the urging force of the urging member. The release button 34C and the transmission member 34D are preferably connected via a cam, for example. The transmission member 34D is urged in a direction away from the lock arm 46 by an urging member.

Figure 9:
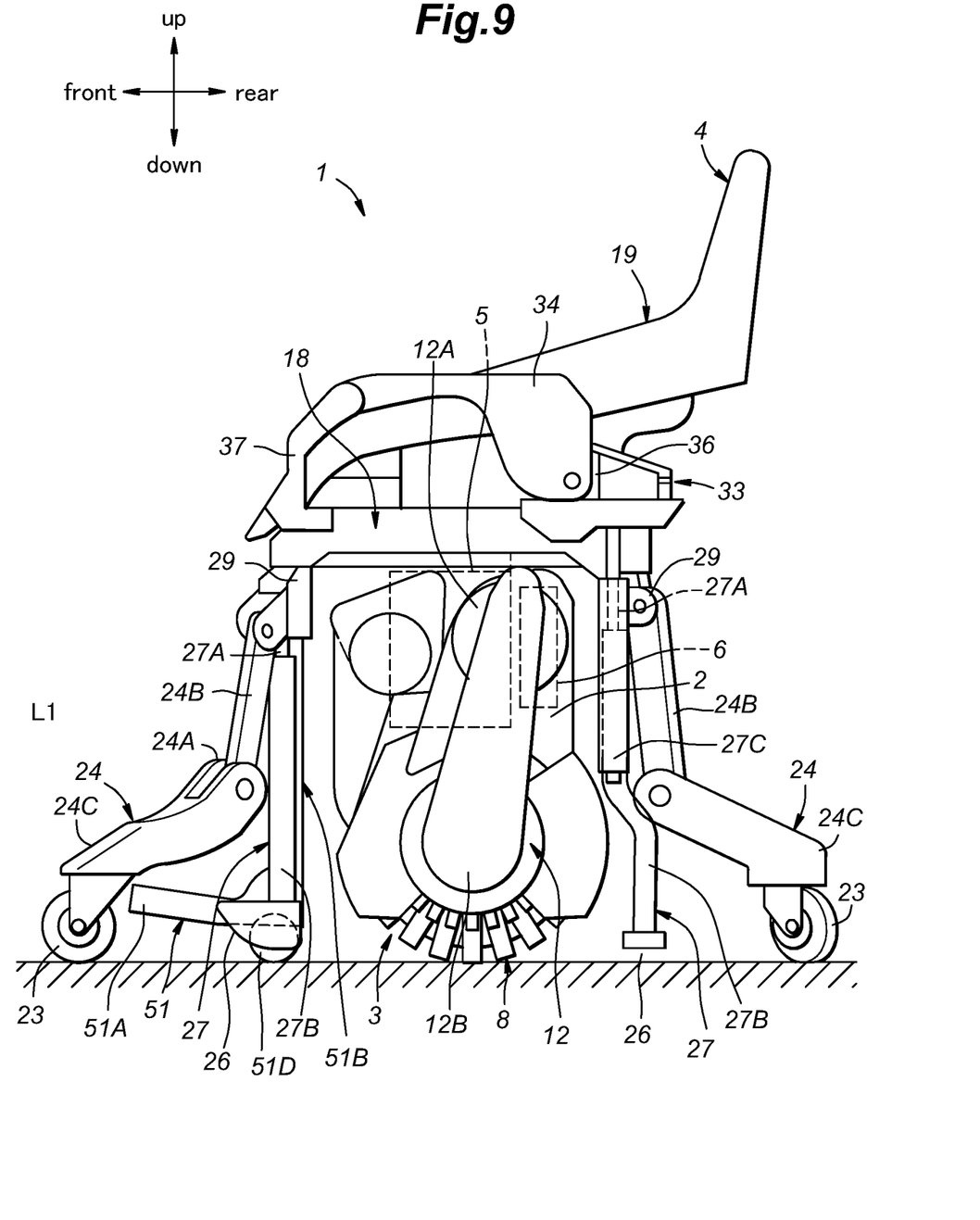
FIG. 9 is a side view of the vehicle as seen from left when the seat is in the low position and second legs are in a retracted position.

When the user operates the left lever 34 to pivot from the initial position to the operation position, the first pressing part 34A of the left lever 34 pushes the left input member 41, and the left input member 41 pivots from the initial position to the operation position. When the left input member 41 pivots, the left first link 43 causes the drive shaft 42 to pivot. The pivoting of the drive shaft 42 causes the left and right second links 44 to move upward, and the left and right second links 44 pull up the rear left and rear right second leg lower portions 27B upward against the urging force. Namely, as shown in FIG. 9, the rear left and rear right second legs 27 contract.

Also, the drive shaft 42 rotates, the right first link 43 causes the right input member 41 to pivot from the initial position to the operation position. At this time, the right input member 41 pivots independently from the right lever 34, and therefore, the right lever 34 is maintained in the initial position. Namely, displacement of one of the two levers 34 is not transmitted to the other of the two levers 34.

When the left and right input members 41 pivot toward the operation position, the corresponding control cables 45 cause the front left and front right second leg lower portions 27B to move upward against the urging forces of the corresponding urging members. Namely, the front left and front right second legs 27 contract.

If the user operates the lever 34 to pivot to the operation position when the seat 4 is in the low position, the all second legs 27 contract, and the contact members 26 move from the use position in which the contact members 26 are in contact with the floor surface to the retracted position in which the contact members 26 are separated from the floor surface. In this way, when the seat 4 is in the low position, the contact members 26 are displaced between the use position and the retracted position according to the position of the lever 34. The left and right first links 43, the drive shaft 42, the left and right second links 44, and the left and right control cables 45 function as an output member for displacing each of the second legs 27 according to displacement of the input member 41.

As shown in FIG. 3, the vehicle 1 includes at least one support member 51 extending downward from the seat 4. The support member 51 has a footrest 51A at the lower portion thereof to support the soles of the user. In the present embodiment, the vehicle 1 includes a pair of left and right support members 51. Each support member 51 is provided to be vertically displaceable relative to the seat 4.

In correspondence with the pair of left and right support members 51, the seat 4 includes a pair of left and right tubular receiving parts 53 that extend vertically. The left receiving part 53 is provided on the front left leg supporting part 29, and the right receiving part 53 is provided on the front right leg supporting part 29. Each support member 51 includes a shaft part 51B slidably supported by the receiving part 53 and a stopper 51C provided on the upper portion of the shaft part 51B. The footrest 51A is joined to the lower portion of the shaft part 51B. The stopper 51C defines the lower limit position of the shaft part 51B relative to the receiving part 53 by contacting the upper end of the receiving part 53. The shaft part 51B is preferably formed of a pipe material, for example.

When the seat 4 is in the low position, the lower ends of the left and right footrests 51A contact the upper surface of the coupling member 31, and each stopper 51C is disposed in a position separated upward from the receiving part 53. In this state, the lower end of the shaft part 51B is separated from the floor surface. When the seat 4 moves from the low position toward the high position, the front left and front right second legs 27 extend, and the receiving parts 53 ascend relative to the support members 51. Therefore, as the seat 4 ascends, the distance between the seat 4 and the footrests 51A increases. Thereafter, when the seat 4 ascends further, the receiving parts 53 come into contact with the stoppers 51C.

The lower end of each shaft part 51B may be provided with a roller 51D. In this case, it is preferred if the lower end of the shaft part 51B contacts the floor surface via the roller 51D. Thereby, the vehicle 1 can travel in the state in which the support members 51 are in contact with the ground.

Preferably, the left and right shaft parts 51B are joined to each other by a coupling member 54 that extends laterally. The left and right shaft parts 51B are disposed between the front left second leg 27 and the front right second leg 27. The left and right footrests 51A extend forward and laterally inward from the corresponding shaft parts 51B.

When the seat 4 is in the low position, the lower end of each shaft part 51B contacts the floor surface via the roller 51D, and each stopper 51C is disposed in a position separated upward from the receiving part 53. When the seat 4 moves from the low position toward the high position, each receiving part 53 ascends relative to the support member 51. During this, each support member 51 is maintained in contact with the ground. Therefore, as the seat 4 ascends, the distance between the seat 4 and the footrest 51A increases. Thereafter, when the seat 4 ascends further, the receiving part 53 comes into contact with the stopper 51C. When the seat 4 ascends further with the receiving part 53 contacting the stopper 51C, the support member 51 ascends integrally with the seat 4, and the lower end of the shaft part 51B leaves the floor surface.

When the seat 4 is in the high position, the stopper 51C is in contact with the receiving part 53. When the seat 4 moves from the high position toward the low position, the support member 51 descends together with the receiving part 53. Thereafter, when the seat 4 reaches a certain height, the lower end of the shaft part 51B of the support member 51 contacts the floor surface via the roller 51D, and the descent of the support member 51 ends. Subsequently, the receiving part 53 is separated from the stopper 51C and moves downward relative to the support member 51. Therefore, as the seat 4 descends, the distance between the seat 4 and the footrest 51A decreases. In this way, the support member 51 is displaced such that the distance L2 between the seat 4 and the footrest 51A when the seat 4 is in the high position (see FIG. 2) is greater than the distance L1 between the seat 4 and the footrest 51A when the seat 4 is in the low position (see FIG. 1).

The shaft part 51B moves in the up-down direction relative to the receiving part 53. Therefore, the angle and the front-rear position of the footrest 51A relative to the seat 4 when the seat 4 is in the low position are the same as the angle and the front-rear position of the footrest 51A relative to the seat 4 when the seat 4 is in the high position. Thus, since the angle and the front-rear position of the footrest 51A relative to the seat 4 do not change even when the seat 4 moves from the low position to the high position, the posture of the user is kept stable.

When the seat 4 is in the high position, the lower end of the contact member 26 of the second leg 27 is disposed lower than the lower end of the roller 23 of the first leg 24 and the lower end of the roller 51D of the shaft part 51B is disposed higher than the lower end of the contact member 26. As a result, the contact member 26 comes into contact with the ground earlier than the support member 51. Thereby, the support member 51 can be grounded with good stability with the movement of the vehicle 1 being restricted by the contact member 26.

Figure 6:
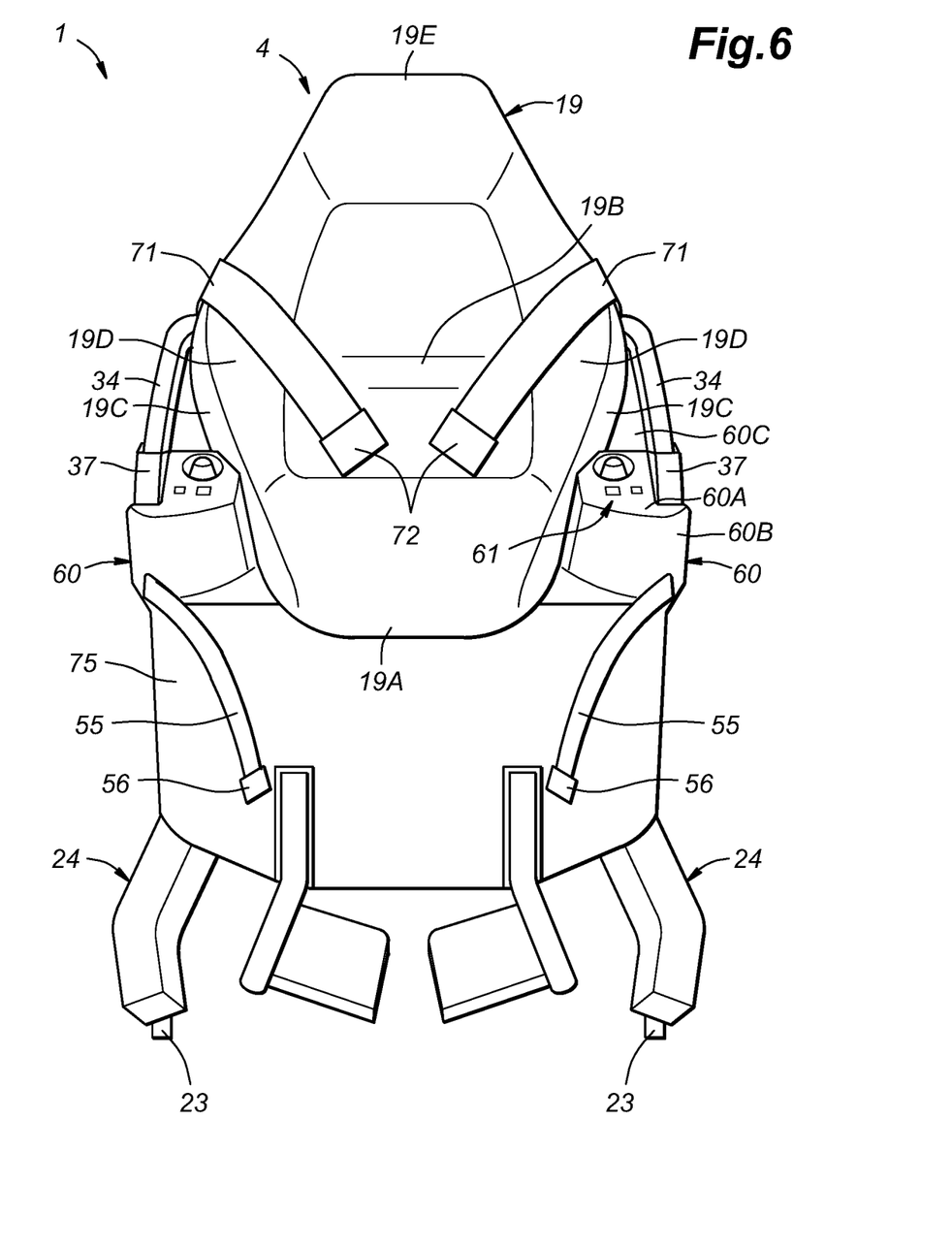
FIG. 6 is a perspective view of the vehicle as seen from front and above.
Figure 7:
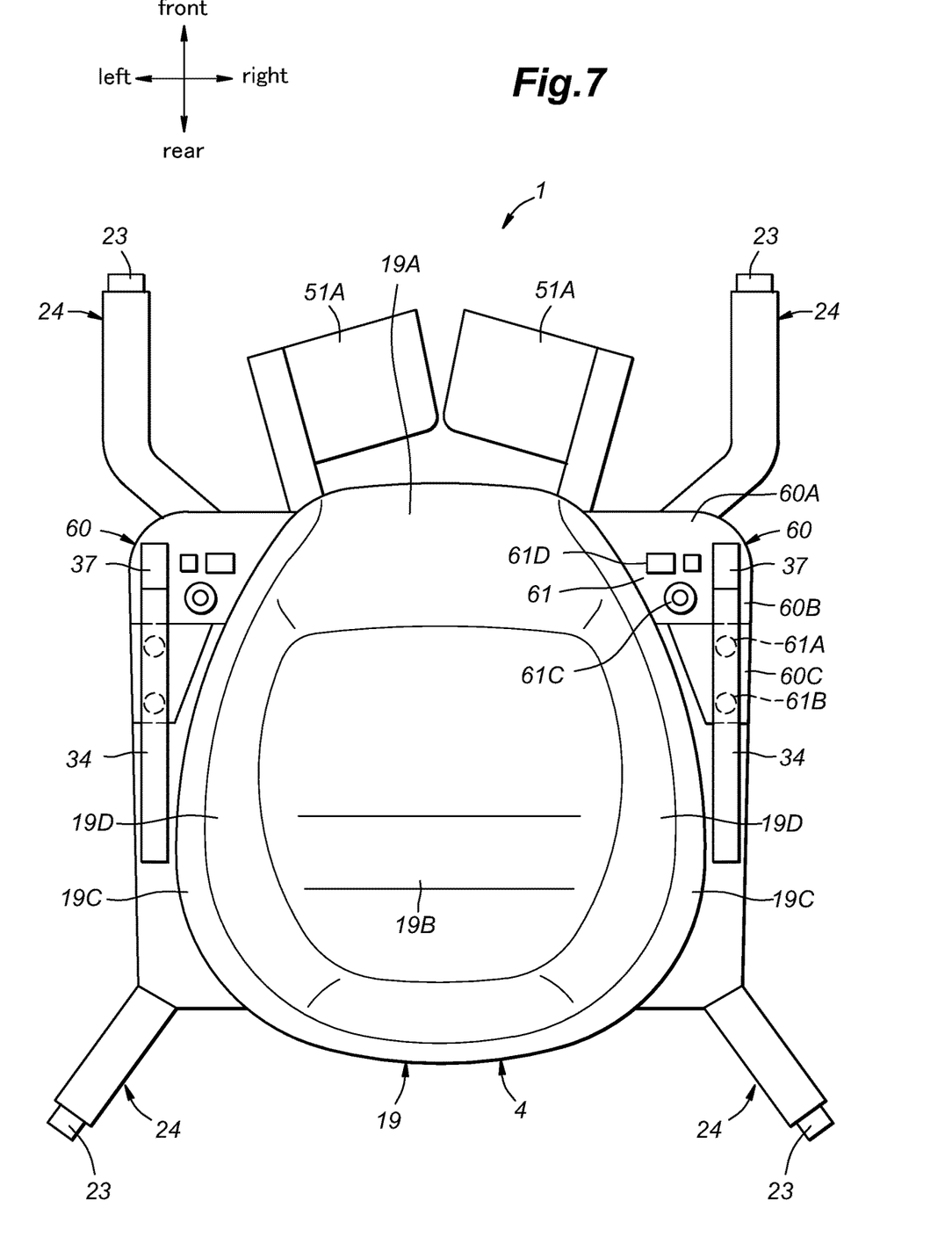
FIG. 7 is a plan view of the vehicle.
Figure 8:
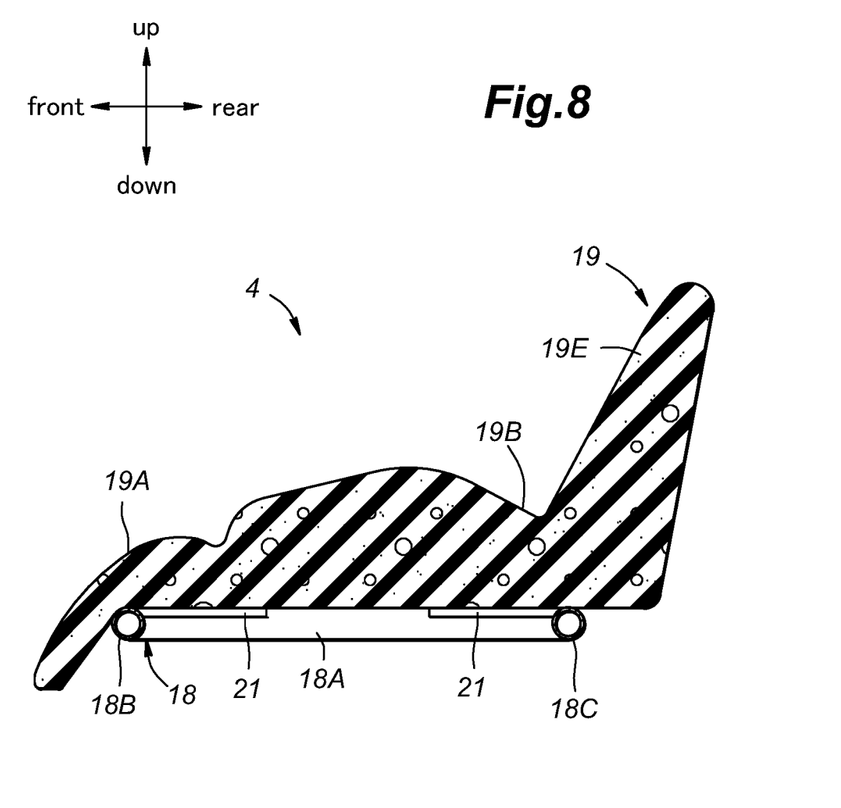
FIG. 8 is a sectional view of a pad of the seat.

The upper surface of the pad 19 contacts the buttocks and the thighs of the user. The front portion of the upper surface of the pad 19 contacts the thighs of the user, while the rear portion of the upper surface of the pad 19 contacts the buttocks of the user. As shown in FIGS. 6 to 8, the upper surface of the front portion of the pad 19 includes an inclined surface 19A that is inclined downward in the forward direction. Specifically, the inclined surface 19A extends from the front end of the pad 19 to the central portion of the pad 19 in the front-rear direction. The inclined surface 19A may extend rearward beyond the central portion of the pad 19 in the front-rear direction. Thereby, the thighs of the user seated on the seat 4 are inclined downward toward the knees.

The upper surface of the rear portion of the pad 19 is provided with a recess 19B that is recessed downward. The recess 19B accommodate the ischia of the user. The recess 19B supports the ischia of the user and prevents the ischia of the user from moving forward and rearward relative to the pad 19.

Left and right side portions 19C of the front portion of the pad 19 are inclined laterally inward in the forward direction as seen from above. The pad 19 includes a pair of left and right bank parts 19D on the left and right side portions thereof such that the bank parts 19D protrude upward. The pair of left and right bank parts 19D suppresses lateral movement of the buttocks of the user. The rear portion the pad 19 may be provided with a backrest 19E that protrudes upward.

The seat 4 is provided with a knee belt 55 for restraining the knees of the user on the front portion of the pad 19. The knee belt 55 includes a left knee belt 55 joined to the left side member 18A or the left front lever support 37 and a right knee belt 55 joined to the right side member 18A or the right front lever support 37. The left and right knee belts 55 are detachably joined to each other by means of coupling members 56 such as a buckle and a tongue.

As shown in FIGS. 6 and 7, the vehicle 1 includes an operation device 60 provided on at least one of the left side portion and the right side portion of the seat 4. In the present embodiment, two operation devices 60 are provided on the left side portion and the right side portion of the seat 4, respectively. Thereby, even in a case where the user has disability with one of the left and right hands, the user can operate the vehicle with the other hand. Preferably, the left and right operation devices 60 have an identical configuration.

The operation device 60 includes an operation panel 60B having an operation surface 60A that faces upward, and multiple operation members 61 provided on the operation surface 60A. The lever 34 constitutes a part of the operation device 60 and extends upward and forward from the rear portion of the operation panel 60B.

The operation panel 60B is disposed to cover the lower portion of the front lever support 37 and the rear lever support 36. The operation panel 60B is preferably supported on at least one of the front lever support 37, the rear lever support 36, and the seat frame 18. The operation panel 60B extends in the fore and aft direction along the side portion 19C of the pad 19. The lever 34 extends in the fore and aft direction above the operation panel 60B. Since the side portion 19C of the front portion of the pad 19 extends to be inclined laterally inward, the distance between the front end portion of the lever 34 and the pad 19 in the lateral direction is greater than the distance between the rear end portion of the lever 34 and the pad 19 in the lateral direction. The upper portion of the front lever support 37 protrudes upward from the operation panel 60B.

As shown in FIG. 7, the multiple operation members 61 preferably include a power switch 61A, a lifting switch 61B, a moving direction switch 61C, and a travel mode selector switch 61D. The power switch 61A, the lifting switch 61B, the moving direction switch 61C, and the travel mode selector switch 61D are preferably provided on each of the left and right operation devices 60. The multiple switches are connected to the control unit 6.

As seen from above, at least one the multiple operation members 61 is disposed in a position overlapping with the lever 34. Preferably, the operation panel 60B is provided with a recess 60C that is recessed downward from the operation surface 60A below the lever 34. Also preferably, at least one of the multiple operation members 61 is disposed in a bottom portion of the recess 60C. In the present embodiment, the power switch 61A and the lifting switch 61B are disposed in positions overlapping with the lever 34, and the power switch 61A and the lifting switch 61B are disposed in the bottom portion of the recess 60C. Since the lever 34 is disposed above at least one of the operation members 61, the user is prevented from inadvertently touching the operation members 61. Therefore, it is possible to prevent erroneous operation of the operation members 61 by the user. The at least one operation member 61 disposed below the lever 34 preferably includes those that can significantly influence the behavior of the vehicle 1, such as the lifting switch 61B and the power switch 61A. Also, since some of the operation members 61 are disposed in the recess 60C, it is possible to prevent erroneous operation of these operation members 61 by the user even more reliably. The user can operate the power switch 61A and the lifting switch 61B through a gap between the front portion of the lever 34 and the pad 19.

The operation surface 60A is disposed lower than the upper edge of the bank part 19D. Therefore, the user's inadvertently touching of the operation members 61 disposed on the operation surface 60A can be prevented even more effectively. In the initial position, the lever 34 is disposed at the same height as the upper edge of the bank part 19D.

The moving direction switch 61C is a switch for operating the drive units 3. The moving direction switch 61C preferably is a joystick. The moving direction switch 61C is disposed between the front end portion of the lever 34 and the pad 19 as seen from above. Therefore, the user can operate the moving direction switch 61C, which is a joystick, without being obstructed by the lever 34.

At least one of the multiple operation members 61 may be lighted. The user can recognize the position and the activation state of the operation member 61 based on lighting of the operation member 61. At least one of the multiple operation members 61 preferably displays the state of the vehicle 1 by being lighted. For example, the power switch 61A is preferably lighted when the power supply of the vehicle 1 is on, namely, when in the activated state. Also, the lifting switch 61B is preferably lighted when the lift unit 5 is driving. The travel mode selector switch 61D may change the color of the emitted light according to the selected travel mode.

The control unit 6 turns the power supply of the vehicle 1 on/off according to an operation of the power switch 61A by the user. The control unit 6 drives the lift unit 5 to raise/lower the seat 4 according to an operation of the lifting switch 61B by the user. The control unit 6 switches the travel mode of the vehicle 1 between a turning mode and a parallel movement mode according to an operation of the travel mode selector switch 61D by the user.

When the seat 4 is in the low position and one of the levers 34 is in the operation position, the control unit 6 controls the drive units 3 according to an operation of the moving direction switch 61C by the user to make the vehicle 1 travel. Preferably, the position of the seat 4 and the position of the lever 34 are detected by sensors connected to the control unit 6. When the turning mode is selected, the control unit 6 preferably causes the vehicle 1 to turn in a lateral direction corresponding a lateral direction operation of the moving direction switch 61C. Also, when the parallel movement mode is selected, the control unit 6 preferably causes the vehicle 1 to make a parallel movement in a lateral direction corresponding to a lateral direction operation of the moving direction switch 61C.

Since the lever 34 in the initial position is supported by the front lever support 37 from below, the user can use the lever 34 as a handrail when getting on and off the vehicle 1. Also, since the lever 34 in the initial position is disposed at the same height as the upper edges of the bank parts 19D, the user can easily use the lever 34 as a handrail when getting on and off the vehicle 1.

As shown in FIG. 6, the left and right knee belts 55 extend from the left and right side members 18A or the left and right front lever supports 37 to pass through the front end portions of the left and right operation panels 60B to outside, respectively. The knee belts 55 cooperate with the front end portion of the pad 19 to restrain the knees of the user, thereby to make the user stably seated on the seat 4. Also, the seat frame 18 is provided with a waist belt 71 for restraining the waist of the user to the seat 4. The waist belt 71 includes a left waist belt 71 extending from the rear portion of the left side member 18A to pass through the rear portion of the left operation panel 60B and a right waist belt 71 extending from the rear portion of the right side member 18A to pass through the rear portion of the right operation panel 60B. The tips of the left and right waist belts 71 are provided with coupling members 72 that are detachably joined to each other.

An outer shell 75 may be attached to the lower portion of the vehicle 1. Preferably, each second leg 27, the shaft part 51B of each support member 51, and the first leg upper portion 24B of each first leg 24 are disposed inside the outer shell 75. The lower end of the first leg lower portion 24C of each first leg 24 preferably protrudes to the outside of the outer shell 75.

An operation of the vehicle 1 configured as described above will be described in the following. As shown in FIG. 1, when the seat 4 is in the low position and the lever 34 is in the initial position, the drive wheels 8 of the left and right drive units 3, the roller 23 of each first leg 24, the contact member 26 of each second leg 27, and the lower end of each support member 51 are grounded. In this state, since each contact member 26 is grounded, movement of the vehicle 1 in the horizontal direction is restricted. This state is referred to as a stop state of the vehicle 1. When the vehicle 1 is in the stop state, the user can get on and off the vehicle 1. At this time, the user can use the left and right levers 34 as handrails.

When the user moves one of the levers 34 from the initial position to the operation position in the stop state of the vehicle 1, each second leg 27 contracts upward so that each contact member 26 is separated from the floor surface as shown in FIG. 9. This state is referred to as a low position travelable state. In the low position travelable state, the user can make the vehicle 1 travel by operating the moving direction switch 61C. When the user moves the lever 34 to the operation position, the lock arm 46 locks the input member 41 to maintain the input member 41 in the operation position. Therefore, the user can return the lever 34 to the initial position to be locked by the lock device 38. When the user presses the release button 34C, each second leg 27 extends so that each contact member 26 is grounded, and the vehicle 1 is brought into the stop state.

When the user operates the lifting switch 61B in the stop state of the vehicle 1, the control unit 6 drives the lift unit 5 so that the seat 4 moves from the low position to the high position as shown in FIG. 2. As a result of the raising of the seat 4, the roller 23 of each first leg 24 and the contact member 26 of each second leg 27 are separated from the floor surface. At this time, each support member 51 is maintained in contact with the coupling member 31 until the stopper 51C contacts the receiving part 53, and therefore, the distance between the footrest 51A and the seat 4 increases.

After each support member 51 is separated from the floor surface, only the drive wheels 8 of the left and right drive units 3 are in contact with the ground. At this time, the posture of the vehicle 1 is maintained by the inverted pendulum control. In this state, the control unit 6 detects displacement of the center of gravity of the vehicle 1 due to movement of the user's weight and controls the drive units 3 to make the vehicle 1 travel accordingly.

Due to movement of the seat 4 from the low position to the high position, the knees of the user seated on the seat extend (the knee angle becomes large) and an amount of forward protrusion of the knees is decreased. Therefore, the footprint of the vehicle 1 including the user, namely, the occupied area of the vehicle 1 including the user as seen from above, becomes smaller. As a result, the vehicle can easily move in narrow locations. In addition, when the seat 4 moves from the low position to the high position, the height of the eyes of the user seated on the seat 4 becomes higher. Also, since the legs of the user seated on the seat 4 extend vertically, the user's back is straightened and the posture of the user becomes easier to stabilize. Therefore, even when the seat 4 is raised to the high position, the user can have a sense of ease. Thus, it is possible to provide a vehicle which can raise the height of the user's eyes while giving a sense of ease to the user. Since the support member 51 on which the footrest 51A is provided is displaced relative to the seat 4 due to gravity, no power is necessary for the support member 51. Thus, the energy efficiency of the vehicle 1 can be improved.

Concrete embodiments of the present invention have been described in the foregoing, but the present invention is not limited to the above embodiments and may be modified or altered in various ways. For example, the control unit 6 may prohibit the operation of the lift unit 5 when the input member 41 is not locked to the lock arm 46. Also, it is preferred if the control unit 6 permits raising of the seat 4 by the lift unit 5 when the seat 4 is in the low position and the lever 34 is in the initial position. According to this configuration, it is possible to prevent the seat 4 from being positioned in the high position in the state in which the second legs 27 are in the retracted position.

The vehicle 1 may include a restriction mechanism that maintains the lever 34 in the initial position when the seat 4 is in the high position. Preferably, the restriction mechanism is constituted of an actuator that restricts the movement of the lock device 38 and the control unit 6 that controls the actuator, for example. Preferably, the control unit 6 detects the position of the seat 4, drives the actuator when the seat 4 is in the high position to maintain the displacement member 38C of the lock device 38 in the lock position. On the other hand, the control unit 6 preferably separates the actuator from the displacement member 38C when the seat 4 is in the low position to allow rotation of the displacement member 38C.

The invention claimed is:

1. A vehicle, comprising:
a vehicle body frame;
a drive unit provided on the vehicle body frame and movable on a floor surface;
a seat disposed above the vehicle body frame to support buttocks of a user;
a lift unit provided between the vehicle body frame and the seat to raise and lower the seat between a low position and a high position; and
at least one support member extending downward from the seat and provided, at a lower portion thereof, with a footrest for supporting soles of the user,
wherein the support member is provided to be displaceable vertically relative to the seat,
the support member is displaced such that a distance between the seat and the footrest when the seat is in the high position is greater than a distance between the seat and the footrest when the seat is in the low position,
the seat includes a tubular receiving part that extends vertically,
the support member includes a shaft part which is slidably supported in the receiving part and to which the footrest is joined and a stopper provided on an upper portion of the shaft part to define a lower limit position of the shaft part relative to the receiving part by contacting an upper end of the receiving part, and
when the seat is in the low position, a lower end of the shaft part contacts the floor surface and the stopper is disposed in a position separated upward from the receiving part.

2. The vehicle according to claim 1, wherein an angle and a front-rear position of the footrest relative to the seat when the seat is in the low position are same as an angle and a front-rear position of the footrest relative to the seat when the seat is in the high position.

3. The vehicle according to claim 1, wherein the lower end of the shaft part is provided with a first roller.

4. The vehicle according to claim 1, further comprising:
at least one first leg extending downward from the seat and provided with a second roller at a lower end thereof; and
at least one second leg extending downward from the seat and provided with a contact member at a lower end thereof,
wherein when the seat is in the high position, the second roller and the contact member are separated from the floor surface, and
when the seat is in the low position, the second roller and the contact member contact the floor surface.

5. The vehicle according to claim 4, wherein when the seat is in the high position, a lower end of the contact member is disposed lower than a lower end of the second roller and a lower end of the first roller is disposed higher than the lower end of the contact member.

6. The vehicle according to claim 1, wherein the seat includes a pad configured to contact the buttocks and thighs of the user, and
an upper surface of a front portion of the pad is provided with an inclined surface that is inclined downward in a forward direction.

7. The vehicle according to claim 6, wherein an upper surface of a rear portion of the pad is provided with a recess that is recessed downward.

8. The vehicle according to claim 6, wherein the seat includes a knee belt for restraining a knee of the user to the front portion of the pad.

* * * * *